United States Patent [19]

Paulsen

[11] Patent Number: 4,878,721
[45] Date of Patent: Nov. 7, 1989

[54] RESONANT MECHANICAL SYSTEM

[75] Inventor: Dean R. Paulsen, Danvers, Mass.

[73] Assignee: General Scanning, Inc., Watertown, Mass.

[21] Appl. No.: 14,998

[22] Filed: Feb. 17, 1987

[51] Int. Cl.⁴ .............................................. G02B 26/10
[52] U.S. Cl. ..................................... 350/6.6; 358/208; 346/109
[58] Field of Search .................. 350/6.6, 6.4; 346/109; 324/97; 250/335; 358/208

[56] References Cited

U.S. PATENT DOCUMENTS

| | | | |
|---|---|---|---|
| 2,376,557 | 5/1945 | Severance | 171/209 |
| 2,400,262 | 5/1946 | Quinnell | 171/209 |
| 3,473,855 | 10/1969 | Pitner | 303/187 |
| 3,532,408 | 10/1970 | Dostal | 350/6 |
| 3,609,485 | 9/1971 | Dostal | 318/132 |
| 3,691,822 | 9/1972 | Deckard | 73/71.6 |
| 3,959,673 | 5/1976 | Montagu | 350/6.4 |
| 4,364,000 | 12/1982 | Burke, Jr. | 318/128 |
| 4,368,489 | 1/1983 | Stemme et al. | 350/6.6 |
| 4,502,752 | 3/1985 | Montagu | 350/6.6 |

OTHER PUBLICATIONS

FCP Advertisement, "Resonant Optical Scanners", p. 124.

Primary Examiner—Bruce Y. Arnold
Assistant Examiner—Jay Ryan
Attorney, Agent, or Firm—Fish & Richardson

[57] ABSTRACT

A resonant rotationally oscillating mechanical system has a plurality of masses supported by a resilient structure held at both ends on a stationary base to define a natural resonance frequency of intended rotational motion about an axis relative to the base. The resilient structure is asymmetrical along the axis. The masses are subject to additional motion relative to the base in directions different from the direction of intended motion. For a selected mode of motion, the masses and the asymmetrical resilient structure are mutually configured, in accordance with equations of motion, to substantially preclude angular motion of one of the masses relative to the base about an axis other than the axis of the intended rotational motion. In another aspect, the resilient structure has one end attached to the base by a coupler that permits that end to move relative to the base but only at frequencies different from the natural resonance frequency of motion.

21 Claims, 4 Drawing Sheets

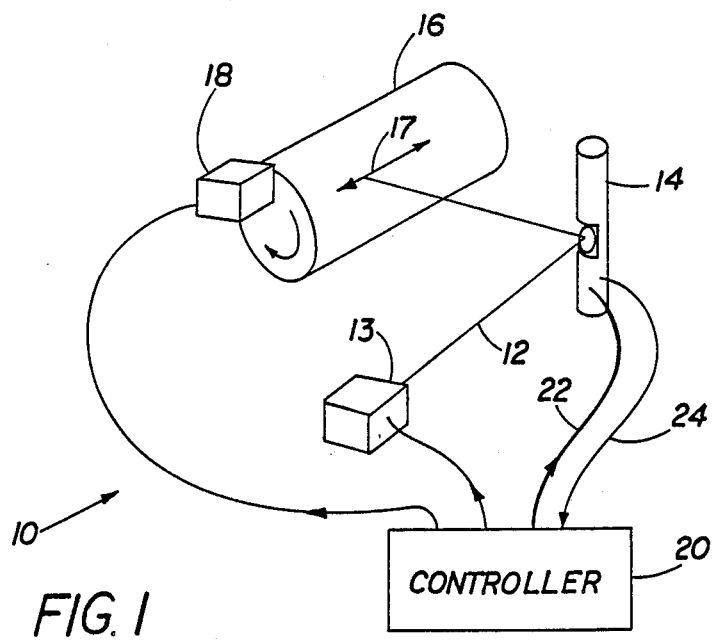
FIG. 1
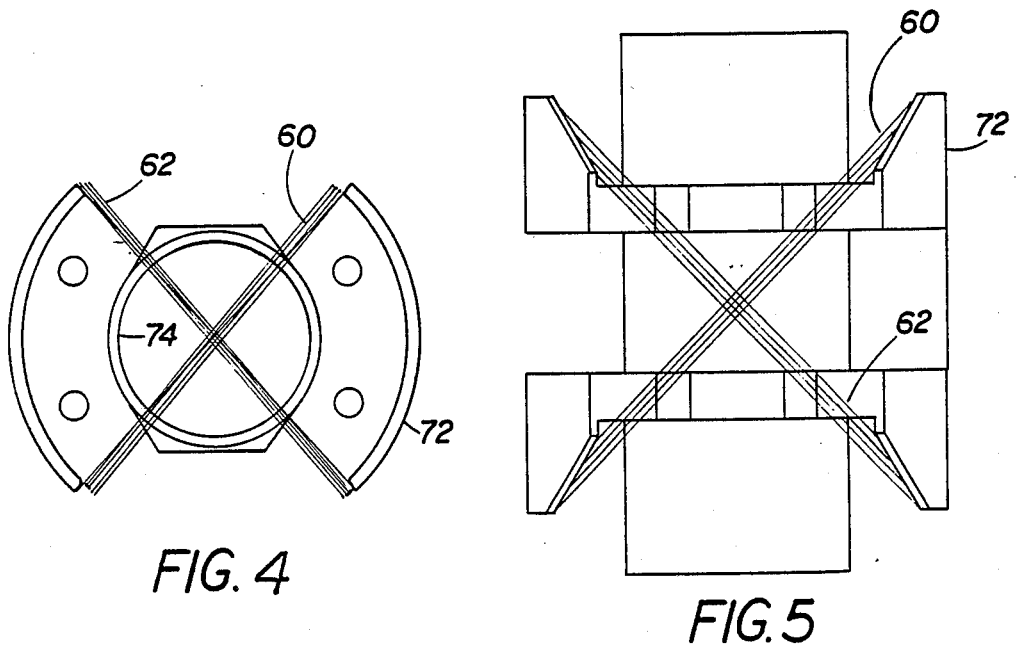
FIG. 4
FIG. 5

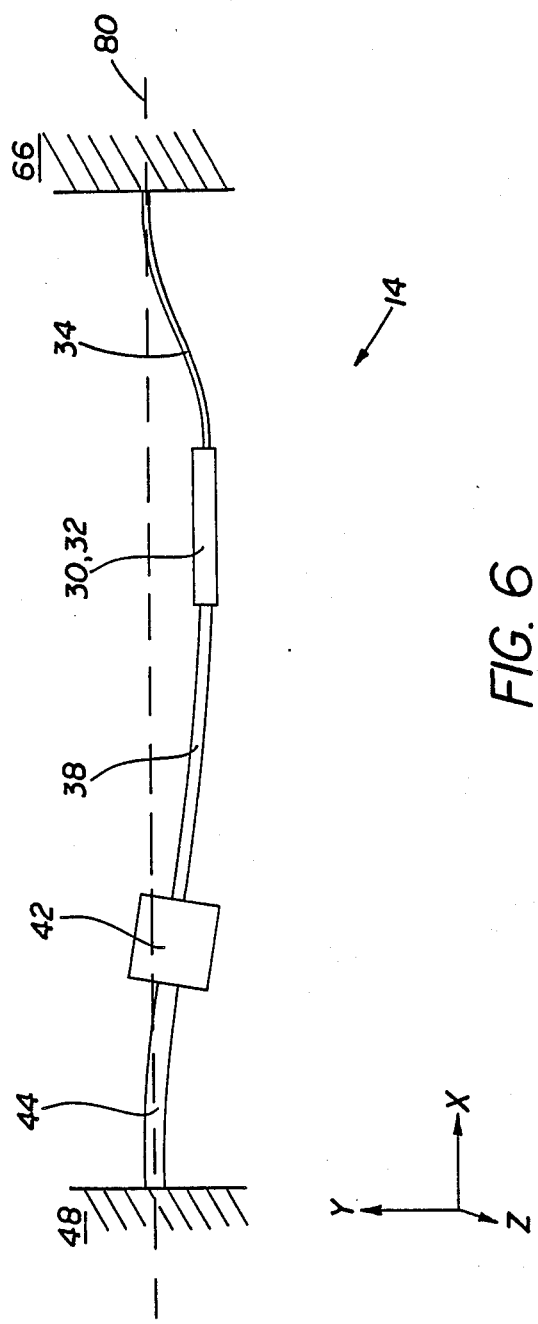

RESONANT MECHANICAL SYSTEM

BACKGROUND OF THE INVENTION

This invention relates to resonant mechanical systems.

In one use of such systems, called laser printing, a focused laser spot is raster scanned across a light sensitive medium to generate an image. To accomplish high-speed scanning along one dimension of the medium, the laser beam is deflected across by a mirror that is supported symmetrically between two colinear torsion bars to effect resonant rotational motion (see, e.g., Montagu, U.S. Pat. No. 4,502,752, issued Mar. 5, 1985). The beam is slow scanned along the other dimension by moving the medium itself. Practical symmetrical scanners of this design have an upper frequency limit of about 2500 Hz and are relatively complex to make.

In such symmetrical scanners (which are characterized by having an odd number of rotating masses), the centrally supported mirror may be subject to cross-axis vibration. In the fundamental mode of cross-axis vibration, the mirror can move at right angles to the axis without tilting.

It is also known to support a resonantly rotating mirror asymmetrically, for example by mounting it at the free end of a torsion bar, the other end being fixed to the base of the scanner. The armature of a driving element is attached in the middle region of the torsion bar. The stationary part of the driving element is in turn mounted on the fixed base. The torsion bar need not have a uniform cross-section along its length. Such asymmetrical scanners have performance advantages over symmetrical designs, but the mirror is subject to tilt (called wobble), which reduces the accuracy of the scanning. Asymmetrical designs by definition have an even number of masses and thus cannot be constructed symmetrically.

SUMMARY OF THE INVENTION

A scanner in accordance with the invention has a carefully designed asymmetrical structure in which the mirror, although subject to cross-axis wobble when subjected to a static force (as expected), avoids cross-axis wobble in a fundamental mode of cross-axis resonant motion. The invention thus achieves the advantages of a symmetrical scanner in a small, high-performance, simple, inexpensive asymmetrical structure. The dynamic characteristics of the structure are aided, in part, by supporting one end of the torsion bar on a slidable coupler that slowly relieves stress while holding the torsion bar fixed, with respect to motion at the natural resonance frequency.

A general feature of the invention is a resonant rotationally oscillating mechanical system in which a plurality of masses are supported by a resilient structure held at both ends on a stationary base to define a natural resonance frequency of intended rotational motion about an axis relative to the base. The resilient structure is asymmetrical along the axis. The masses are subject to additional motion relative to the base in directions different from the direction of intended motion. For a selected mode of motion, the masses and the asymmetrical resilient structure are mutually configured, in accordance with equations of motion, to substantially preclude angular motion of one of the masses relative to the base about an axis other than the axis of the intended rotational motion.

Preferred embodiments of the invention include the following features.

The resilient structure has one end attached to the base by a coupler that effectively fixes that end against motion at the natural resonance frequency, but permits axial motion at other frequencies to relieve stress. The resilient structure is driven rotationally about an axis of the resilient structure by a mass (e.g., a permanent magnet) mounted at one driving location along its length. Another mass (e.g., an optical element) is driven resonantly at a location along the resilient structure that is spaced apart from the permanent magnet. The resilient structure has first, second, and third torsional segments that all lie along a nominal torsion axis when the system is at rest. The torsional spring constant of the first segment is larger than that of the second, and the second segment's is larger than that of the third. The torsional shear stresses on the three segments is equal. The selected mode of motion (for which angular motion about an axis other than the axis of intended rotation is precluded) is the lowest frequency mode.

By separating the driving element from the optical element, and supporting them asymmetrically, the construction is simplified and performance is high. Using three properly designed torsional segments minimizes wobble of the optical element in the selected mode of cross-axis vibration. The scanner can be made extremely small.

Another general feature of the invention is a resonant mechanical system having at least one mass supported on a stationary base by a resilient structure to define a natural resonance frequency of intended motion relative to the base. The resilient structure has one end attached to the base by a coupler that permits that end to move relative to the base but only at frequencies lower than the natural resonance frequency of rotational motion.

Preferred embodiments of the invention include the following features.

The coupler has two cooperating cylindrical surfaces located respectively on the resilient structure (a torsion element) and on the base; the surfaces are slidable axially relative to each other and are separated by a gap; the gap contains a soft wax that permits relative axial motion of the surfaces but only at frequencies different than the intended natural frequency. The resilient structure is rigidly attached to the base at a second location spaced apart from the coupler. The mass is mounted on the torsion element between the coupler and the location of rigid attachment.

The coupler minimizes stresses on the resilient element in the axial direction, by permitting low frequency adjustment of the coupler, while minimizing dissipation of energy at the intended natural resonance frequency of rotation.

Other advantages and features will become apparent from the following description of the preferred embodiment, and from the claims.

DESCRIPTION OF THE PREFERRED EMBODIMENT

We first briefly describe the drawings.

FIG. 1 is a diagram of a laser printing system.

FIGS. 4, 5 are top and side views, respectively, of a bobbin for drive and sensing coils of the resonant scanner.

FIG. 6 is a diagram of the scanner in one mode of transverse motion.

STRUCTURE

Figures 2, 3:
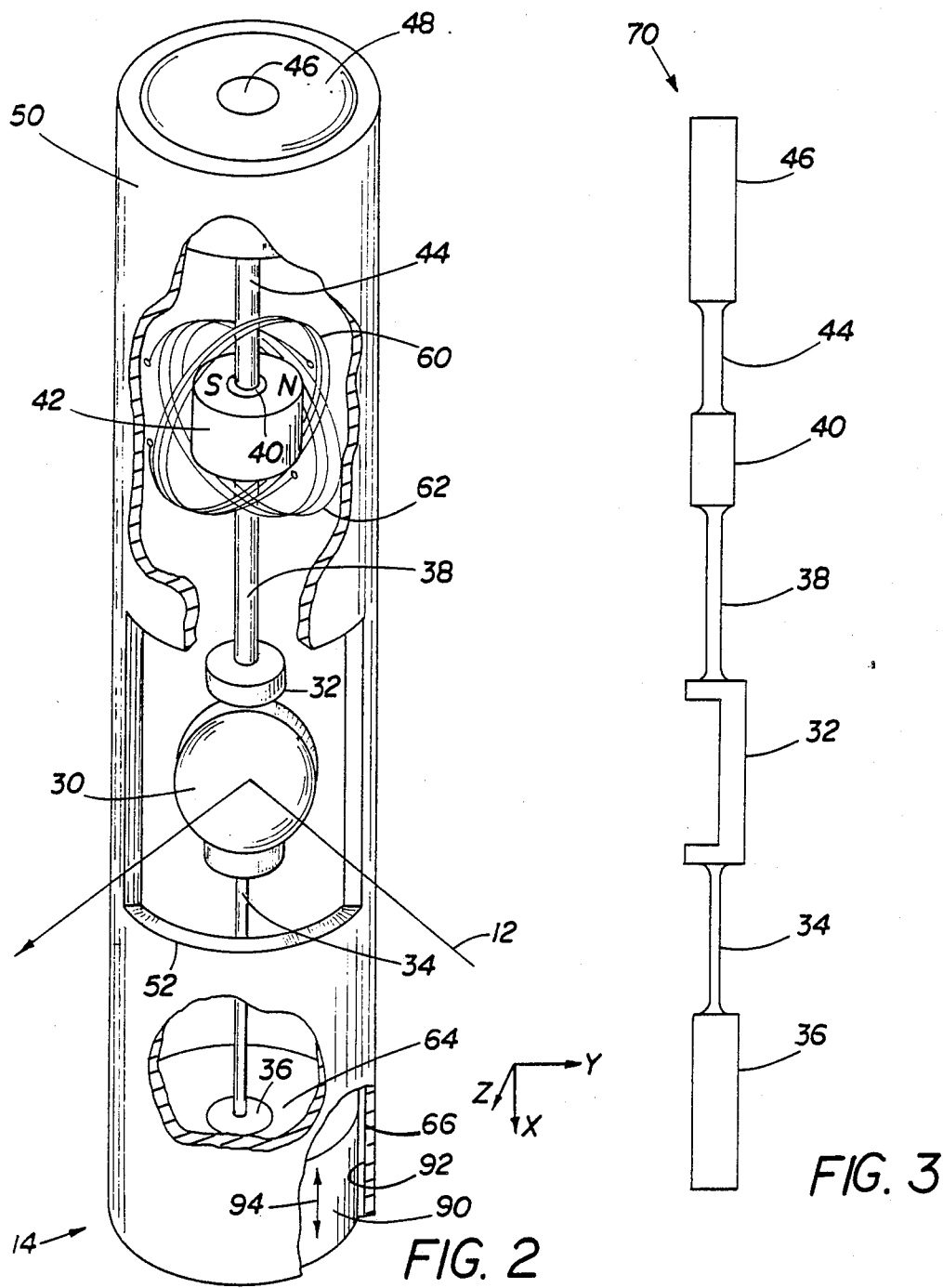
FIG. 2 is a perspective view, not to scale and partially cutaway, of a resonant scanner.
FIG. 3 is a side view of the torsion element of the resonant scanner.

Referring to FIG. 1, in a laser printer 10, a focused laser beam 12 from a laser source 13 is deflected by a high-speed resonant scanner 14 to scan successive lines along the length of a rotating drum (indicated by arrows 17) bearing a light-sensitive medium. Drum 16 is rotated at a slower speed by a drum driver 18 to move the light-sensitive medium to the proper location to receive each successive scan line. A controller 20 coordinates the operation of driver 18, laser beam source 13, and scanner 14. Scanner 14 is driven by signals passed over line 22 based in part on feedback signals received over line 24.

Referring to FIG. 2, in scanner 14 laser beam 12 is deflected by the surface of a mirror 30, mounted on a support 32. Support 32 is part of an asymmetrical torsion bar assembly (structure) having three colinear torsion bar segments. One torsion bar segment 34 extends from one end of support 32 to a cylinder 36 (mounted in a manner to be described). A second torsion bar segment 38 extends from the other end of support 32 to a cylinder 40 on which a cylindrical samarium cobalt drive magnet 42 is mounted. A third torsion bar segment 44 extends from the other end of cylinder 40 to a cylinder 46 which is rigidly attached to a hub 48. Hub 48 is in turn rigidly attached to a low carbon steel tubular housing 50 that has a window 52 for passing beam 12 to and from mirror 30.

A drive coil 60 and a velocity sensing coil 62 are wound about magnet 42 respectively in two planes that intersect. The S and N poles of magnet 42 are aligned with the two intersections of the planes of coils 60, 62 (as shown) when the mirror 30 is at rest in its neutral position. Drive coil 60 and sensor coil 62 are connected respectively to lines 22, 24 (FIG. 1).

Cylinder 36 is rigidly attached to a hub 64 and hub 64 is attached to housing 50, but not rigidly. Instead a soft wax (available under the name Door-Ease from TRW of Cleveland, Ohio) capable of cold flow or creep fills a small annular space 66 between the outer wall of hub 64 and the inner wall of housing 50. The soft wax permits hub 64 to slide axially relative to housing 50 to accommodate low frequency changes in the relative lengths of the torsion bar assembly and housing 50 which result, for example, from ambient temperature changes. This minimizes any axial tension or compression on the torsion bar assembly. The soft wax does not, however, permit hub 64 to slide in response to higher frequency vibrations caused, for example, by the rotational motion of mirror 30.

Mirror 30 with armature 40, 42 and the three torsion bar segments thus together form a resonant rotational mechanical system.

Referring to FIG. 3, torsion bar assembly 70 is machined from a single length of type 01 drill rod.

Referring to FIGS. 4, 5, coils 60, 62 are wound on a plastic bobbin 72 whose outer diameter is small enough to just fit within housing 50 and whose inner bore 74 is large enough to accommodate magnet 42.

Dimensions and characteristics of the elements of scanner 14 are as follows:

| | |
|---|---|
| housing 50 | 2.36" long, 0.563" inside diameter, 0.625" outside diameter |
| mirror 30 | 7 mm dia., 2.5 mm thick, located 0.93" from the hub 66 end of scanner |
| drive coil 60 | 400 turns #39 wire |
| velocity sensor coil 62 | 400 turns #39 wire |
| magnet 42 | 0.2" long, 0.25" outside diameter, 0.1" inside diameter |
| torsion bar segment 44 | 0.0455" dia., 0.25" long |
| torsion bar segment 38 | 0.0346" dia., 0.387" long |
| torsion bar segment 34 | 0.020" dia., 0.332" long |
| cylinder 46 | 0.1010" dia., 0.400" long |
| cylinder 40 | 0.1010" dia., 0.200" long |
| support 32 | 0.135" dia., 0.393" long |
| cylinder 36 | 0.1010" dia., 0.400" long |
| peak torsion bar stress | 46500 psi at 30 degrees opt peak-to-peak |
| primary torsional resonance frequency | 2575 Hz |
| secondary torsional resonance frequency | 4055 Hz |
| cross-axis resonant frequency | 1050 Hz |
| maximum mirror angle | 7.5 degrees center to peak, mechanical |
| maximum rotor angle | 2.45 degrees center to peak, mechanical |
| drive voltage | 9 volts peak to peak at 20 degrees opt peak-to-peak |
| velocity voltage | 5 volts peak to peak at 20 degrees opt peak-to-peak |
| scan to scan repeatability | better than 0.2 arc-second |
| scan to scan repeatability | 6 to 8 arc-second |

(Note that the inertia of the magnet about the X axis is nearly 4 times as large as the mirror inertia about the X axis.)

Operation

Referring to FIG. 6, in normal operation, scanner 14 is driven in resonant rotational motion about a nominal torsion axis 80 (the X-axis) on which torsion segments 34, 38, 44 normally lie. The resonant motion is achieved by applying an AC current to coil 60 in a conventional manner based in part on the velocity signal from coil 62 (see, e.g., Montagu, U.S. Pat. No. 4,076,798, and Selverstone, U.S. Pat. No. 4,090,112)

Figure 7:
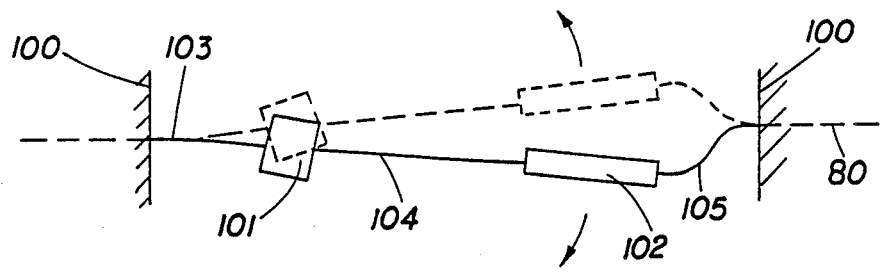
FIGS. 7, 8, 9 are illustrations of three variations of a fundamental cross-axis vibration mode.
Figure 8:
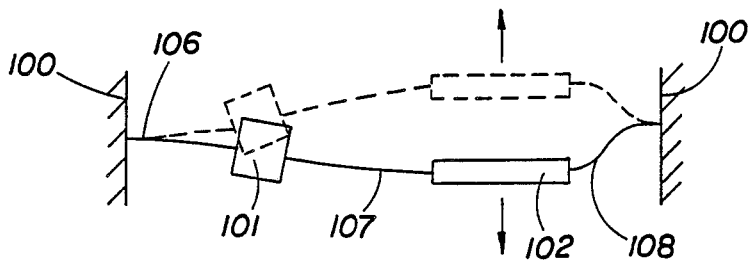
Figure 9:
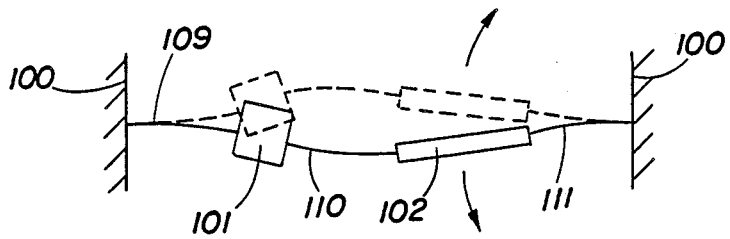

A two body, three spring system such as scanner 14 can undergo four modes of cross-axis vibration. Referring to FIGS. 7, 8, 9, there are three variations of the fundamental mode of vibration. Note that only one of these variations can occur with any given configuration of elements.

In the variation of FIG. 7, both masses 101, 102 translate (cross-axis) and wobble (about an axis normal to the torsion axis 80) in phase with each other. In the variation of FIG. 9, the masses translate in phase, but they rotate 180 degrees out of phase with each other. In the variation of FIG. 8, the translations are in phase, but the rotation of one of the masses (102) is exactly midway between being in phase and 180 degrees out of phase with the other mass. As a result, the amplitude of rotation (in cross-axis or wobble mode) for that mass is zero. This condition is analogous to a symmetrical system vibrating cross-axis in its fundamental mode. Note that although a static force applied to the center of the optical element in a symmetrical system will not cause the element to tilt, in the present asymmetrical scanner 14 such a static force will cause the optical element to tilt. This distinction is critical. The asymmetrical scanners of the present invention only mimic the dynamic behavior of a symmetrical scanner, and do so only in the fundamental transverse vibration mode.

In a three torsion bar segment, two mass scanner as in FIG. 6, the phase and amplitude of rotation of the optical element 30, 32 in the fundamental cross-axis resonance mode can be controlled to exhibit the desired variation represented in FIG. 8 by proper choice of bending stiffnesses of the three torsion bar segments. Such stiffnesses are a function of the torsion bar segment diameters, lengths, and material properties. In the preferred embodiment the material properties of the three segments are the same, but in other embodiments need not be. Furthermore, the selection of the bending stiffnesses can be accomplished without altering the desired natural rotational resonance of the scanner (about the nominal torsion axis). In addition, equal torsional shear stresses can be maintained on all three torsion bar segments. This desirably results in the shortest possible combined length, and thus the highest possible cross-axis resonance frequency.

The following tables illustrate the configurations of the torsion bar segments for three variations of fundamental mode cross-axis motion and show why the FIG. 8 variation was selected for the design of the Preferred embodiment. (Diameters and lengths are in cm; k is the torsional spring constant in dyne-cm/radian; stress is the torsional shear stress in psi; and amplitude is the ratio of wobble rotation to translation of the optical element's fundamental cross-axis resonance in radians/cm. In a typical scanner application the cross-axis resonance rotational amplitudes would be many orders of magnitude smaller than the torsional amplitudes.) Note that in all cases the stresses on the the torsion bar segments are equal.

Variation of FIG. 7 torsion bar segment 103—0.1194 dia×0.635 length; k=0.3940; stress=41616 torsion bar segment 104—0.0918 dia×1.213 length; k=0.0723; stress=41616 torsion bar segment 105—0.0508 dia×0.9411 length; k=0.0087; stress=41616 primary cross-axis resonance: 859 hz; amplitude=0.1056 primary torsional resonance: 2500 hz

Variation of FIG. 8 torsion bar segment 106—0.1175 dia×0.635 length; k=0.3694; stress=46503 torsion bar segment 107—0.0879 dia×0.9824 length; k=0.0749; stress=46503 torsion bar segment 108—0.0508 dia×0.8422 length; k=0.0097; stress=46503 primary cross-axis resonance: 957 hz, amplitude=0.00053 primary torsional resonance: 2500 hz

Variation of FIG. 9 torsion bar segment 109—0.1156 dia×0.635 length; k=0.3461; stress=52539 torsion bar segment 110—0.0837 dia×0.7684 length; k=0.0787; stress=52539 torsion bar segment 111—0.0508 dia×0.7455 length; k=0.0110; stress=52539 primary cross-axis resonance: 1048 hz, amplitude=0.1566 primary torsional resonance: 2500 hz

Note that the optical element cross-axis resonance amplitude of FIG. 8 is more than 200 times smaller than either of the other two variations. Also note that the amplitude of FIG. 9 has changed sign from the other two modes.

The parameters in the above tables were developed by first solving the following equations (which describe a two degree of freedom system resonating in torsion) to obtain the torsion bar sizes. The resonant frequencies and amplitudes were calculated using finite element analysis and the additional inertia and mass parameters listed.

$$K_1 = D_1^4 G\pi/32L_1$$
$$K_2 = D_2^4 G\pi/32L_2$$
$$K_3 = D_3^4 G\pi/32L_3$$
$$T_1 = \theta_1 K_1$$
$$T_2 = \theta_1[(2\pi f)^2 J_1 - K_1]$$
$$T_3 = T_2 + (2\pi f)^2 J_2 \theta_2$$
$$\theta_2 = \theta_1 - T_2/K_2$$
$$\theta_3 = \theta_2 - T_3/K_3$$
$$S_1 = \theta_1 D_1 G/(2L_1)$$
$$S_2 = (\theta_1 - \theta_2)D_2 G/(2L_2)$$
$$S_3 = (\theta_2 - \theta_3)D_3 G/(2L_3)$$
$$S_2 = S_1$$
$$S_2 = S_3$$

where the variables have the following meanings.

| | |
|---|---|
| G | modulus of elasticity |
| f | resonant frequency |
| $J_1$ | mirror 30 and mount 32 inertia about the X axis |
| $J_2$ | magnet 42 inertia about the Y axis |
| $D_1$ | torsion segment 34 diameter |
| $L_1$ | torsion segment 34 length |
| $D_2$ | torsion segment 38 diameter |
| $L_2$ | torsion segment 38 length |
| $D_3$ | torsion segment 44 diameter |
| $L_3$ | torsion segment 44 length |
| $K_1$ | torsion segment 34 spring constant |
| $K_2$ | torsion segment 38 spring constant |
| $K_3$ | torsion segment 44 spring constant |
| $S_1$ | torsion segment 34 stress |
| $S_2$ | torsion segment 38 stress |
| $S_3$ | torsion segment 44 stress |
| $\theta_1$ | maximum angle of mirror 30, center to peak, mechanical |
| $\theta_2$ | maximum angle of magnet 42, center to peak, mechanical |
| $\theta_3$ | angle at clamped end 48 (= zero) |
| $T_1$ | maximum torque on torsion segment 34 |
| $T_2$ | maximum torque on torsion segment 38 |
| $T_3$ | maximum torque on torsion segment 44 |

The following variables were assigned fixed values:
$G = 8.112 \times 10^{11}$ dyne/cm$^2$, f=2500 Hz, $\theta_1$=7.5 degrees, and Magnet rotational inertia about the X axis=0.0563 g-cm$^2$ Magnet rotational inertia about the Y axis=0.05404 g-cm$^2$ Magnet rotational inertia about the Z axis=0.05404 g-cm$^2$ Mirror rotational inertia about the X axis=0.0158 g-cm$^2$ Mirror rotational inertia about the Y axis=0.05635 g-cm$^2$ Mirror rotational inertia about the Z axis=0.05484 g-cm$^2$ Magnet mass=1.202 g Mirror mass=0.5927 g Referring again to FIG. 2, the outer cylindrical surface 90 of hub 64 and the corresponding inner cylindrical surface 92 of housing 50 can slide relative to one another in the x-axis direction (as indicated by arrows 94) and thus form a coupler. The wax in space 66 permits low frequency motion, but prevents high frequency motion. Slow motion caused by wear or ambient temperature shifts are accommodated while vibration corresponding to the resonant motion of mirror 30 is not (thus minimizing the dissipation of energy).

Other embodiments are within the following claims. For example, the scanner can be made even smaller than in the preferred embodiment.

I claim:

1. A resonant rotational optical scanner comprising
   an optical element supported for rotational motion on a stationary base by a torsional structure supporting an even number of masses,
   one said mass comprising said optical element, and
   another said mass comprising an armature of a rotational driver mounted on said torsional structure at a location on said torsional structure spaced apart from the location at which said optical element is mounted on said torsional structure,
   said torsional structure being stiff so as to substantially preclude tilting of said optical element about an axis other than the axis of said rotational motion.

2. A resonant rotationally oscillating mechanical system comprising
   an even number of masses supported at spaced apart locations along a resilient structure held at both ends on a stationary base to define a natural resonance frequency of intended rotational motion about an axis relative to said base,
   said resilient structure, for a selected mode of motion, being stiff so as to substantially preclude angular motion of one of said masses relative to said base about an axis other than said axis of said intended rotational motion.

3. The system of claim 2 wherein said resilient structure has one end attached to said base by a slidable coupler, said coupler being slidable when the system is in rotational motion.

4. The system of claim 2 or 3 wherein
   said selected mode of motion is the fundamental lowest frequency mode.

5. The system of claim 2 or 3 wherein there are two said masses.

6. The system of claim 2 or 3 wherein
   said resilient structure comprises a driving location along its length, and
   one of said masses lies at a location along said resilient structure spaced apart from said driving location.

7. The system of claim 6 wherein
   a second said mass is mounted on said resilient structure at said driving location for imposing rotational driving forces on said resilient structure, and
   said first mass is mounted at said spaced apart location.

8. The system of claim 7 wherein said second mass comprises a permanent magnet.

9. The system of claim 8 wherein said intended motion is rotational and said coupler permits said one end to move axially relative to said base.

10. The system of claim 6 wherein said resilient structure has first, second, and third torsional segments that all lie along a nominal torsion axis when the system is at rest.

11. The system of claim 10 wherein
    said second torsional segment has a higher torsional spring constant than said third torsional segment.

12. The system of claim 6 wherein
    said first mass comprises an optical element.

13. A resonant mechanical system comprising
    at least one mass supported by a resilient structure connected at both ends to a stationary base to define a natural resonance frequency of intended motion relative to said base,
    said resilient structure having one end attached to said base via a slidable coupler, said coupler being slidable when the system is in rotational motion, the coupler permitting said one end to move relative to said base but only at frequencies different from said natural resonance frequency of motion.

14. The system of claim 2 or 13 wherein said coupler comprises two cooperating surfaces located respectively on said resilient structure and on said base, said surfaces being slidable relative to each other, said surfaces being separated by a gap containing a material that permits relative motion of said surface but only at frequencies different from said intended natural resonance frequency.

15. The system of claim 13 wherein said material comprises a soft wax.

16. The system of claim 13 wherein said coupler surfaces are cylindrical.

17. The system of claim 2 or 13 wherein said resilient structure comprises a torsion element.

18. The system of claim 2 or 13 wherein said resilient structure is also rigidly attached to said base at a location spaced apart from said coupler.

19. The system of claim 18 wherein said resilient structure comprises a torsion element and said mass is mounted on said torsion element between said coupler and said location of rigid attachment.

20. The system of claim 13 wherein said mass includes an optical element.

21. A resonant rotational optical scanner comprising
    an optical element supported for rotational motion on a stationary base by a torsional structure supporting an even number of masses, one of said masses comprising said optical element, and
    another of said masses comprising an armature of a rotational driver mounted on said torsional structure at a location on the torsional structure spaced apart from said optical element along said torsional structure,
    said torsional structure configured such that the intended rotation of said optical element is out of phase with the intended rotation of said armature.

* * * * *